M. ALPERN.
SAFETY DEVICE.
APPLICATION FILED JAN. 15, 1916.
1,220,052.
Patented Mar. 20, 1917.
2 SHEETS—SHEET 2.
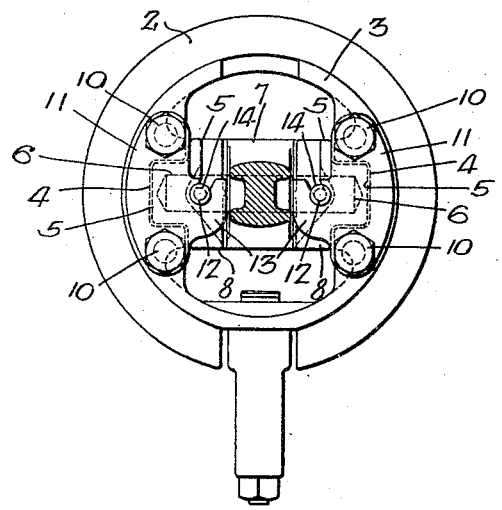
Fig. 2.
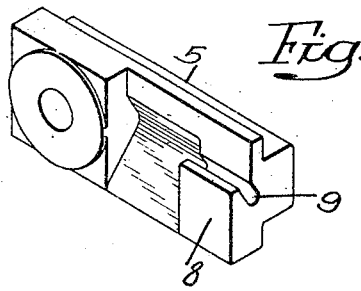
Fig. 4.
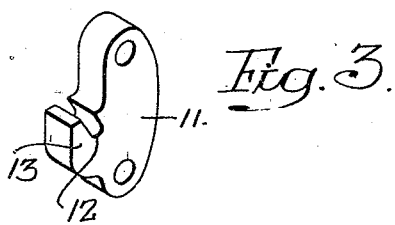
Fig. 3.
Fig. 5.
Inventor:
Maxwell Alpern.
by his Attorneys
Howson & Howson

UNITED STATES PATENT OFFICE.

MAXWELL ALPERN, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA.

SAFETY DEVICE.

1,220,052. Specification of Letters Patent. Patented Mar. 20, 1917.

Application filed January 15, 1916. Serial No. 72,320.

*To all whom it may concern:*

Be it known that I, MAXWELL ALPERN, a citizen of the United States, residing in Philadelphia, Pennsylvania, have invented a Safety Device, of which the following is a specification.

One object of my invention is to provide means for connecting two members, such as a connecting rod and a plunger of a stoker feed which shall be of such construction as to break when said members are subjected to more than a predetermined load,—the invention being characterized by the use of a relatively weak element connecting said members in such a way as to be subjected to tension and capable of breaking when an excessive tensile stress is exerted upon it, thus disconnecting the members before the load on them reaches such a point as to cause injury to the driven apparatus or an overload on the source of power.

Another object of my invention is to so construct two power transmitting members as to permit of their connection by means of a headed tension element, the arrangement being such that said element shall break under tension when said members are called upon to transmit more than a predetermined amount of power.

I also desire to provide a safety device for detachably connecting the plungers and connecting rods of a stoker in which the parts shall be so arranged that any connecting rod shall be maintained approximately in its normal path of movement after the breakage of its safety member so that there shall be practically no possibility of said rod injuriously acting upon or interfering with any of the parts.

These objects and other advantageous ends I secure as hereinafter set forth, reference being had to the accompanying drawings, in which, Figure 1 is a vertical section illustrating my invention as applied to a plunger and connecting rod of a stoker feed;

Fig. 2 is an elevation of the outside end of the plunger showing the connecting rod in section;

Figs. 3 and 4 are perspective views respectively of the rivet engaging member of the plunger and of one of the slides, showing these parts as constructed in accordance with my invention; and Fig. 5 is a perspective view of the relatively weak tension member designed to detachably connect the members shown in Figs. 3 and 4.

Figure 1:
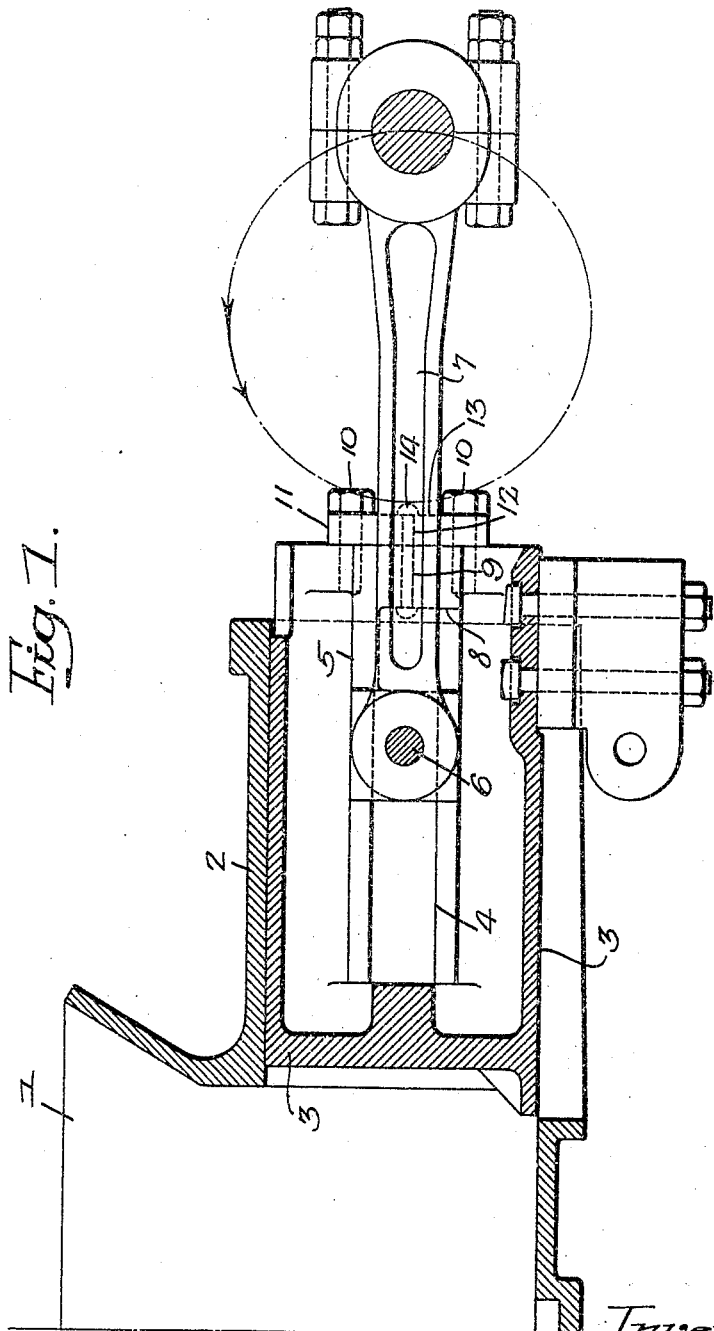

In the above drawings 1 represents the feed hopper of a stoker from which projects a substantially horizontal cylinder 2. Operative in this cylinder is a ram or plunger 3 formed with two opposite internal guideways 4 for the reception of a pair of slides 5 of the construction shown in Fig. 4. These two slides are connected by a pin or pivot 6 which passes through one end of the connecting rod 7 whereby the plunger is reciprocated from a crank. Each of the slides 5 has at its outer end a head in the form of a lateral projection 8 in which is a horizontally extending slot or groove 9 and the plunger has on its outer end two plates 11 of the construction shown in Fig. 3, held in place by bolts 10.

Each of the plates 11 has at one side a projecting portion in which is formed a horizontal slot 12 of substantially the same width as the slot 9 and forming a continuation thereof, and as shown in Fig. 2, both of the slots are extended downwardly from the top surfaces of the head 8 and of the projection 13 of the plate 11 at an angle to the vertical, being designed for the reception of a rivet-like headed member 14. The length of said members is such that when the two slides 5 are immediately adjacent their respective plates 11, one of them may be dropped into each pair of adjacent slots 9 and 12, thus operatively connecting the two slides,—and hence the connecting rod 7, to the ram or plunger 3.

The headed members 14 are of such dimensions and material that under normal conditions of operation they easily withstand the tension applied to them when the plunger 3 is forced into the hopper 1 by the inward movement of the connecting rod 7. If however, abnormal opposition is made to this inward movement of the plunger 3, as by a body of metal becoming jammed in front of it within the hopper 1, the power applied to the connecting rod is sufficient to break the two headed members 14 before damage is done to any of the parts of the apparatus, in which case the two slides merely move inwardly upon their guides and on the next outward stroke, withdraw the plunger 3 to its full outward position by striking the plates 11. Thereafter the slides are reciprocated on the guides until the obstruction is removed and a new pair of headed members is put in place so as to connect the slides 5 and plates 11.

It is particularly to be noted that the headed members 14 are removable with the utmost ease after they have been broken as above described and there is no possibility of any of the parts coacting with them becoming injured by their repeated breakage, where on the other hand in safety devices subjecting a relatively weak member to shear, the shearing faces of the holding members become burred, the broken parts of the pin or weak member are difficult to remove, and the hardened sleeves in which the pins are usually mounted rapidly deteriorate if the pins are sheared repeatedly.

It is further to be noted that in the ordinary forms of safety devices as employed in stoker mechanism the end of the connecting rod is usually free to fall into such a position as to strike the plunger after the breakage of the safety pin, where in my device the connecting rod is retained in its normal position and allowed to operate in its usual path even though it be released from the plunger.

While I have described my invention as applied to detachably connect the rod and plunger of a stoker, it is to be understood that it may be advantageously employed in other devices where it is desired that two members shall be automatically disconnected when the load transmitted by them exceeds a predetermined amount.

I claim:—

1. The combination of a reciprocating member having an upwardly opening slot; a reciprocated member also having an upwardly opening slot and mounted adjacent the first member; with a tension pin having integral heads and mounted in said slots in position to be removable therefrom by a lateral movement, said pin having its heads respectively engaged by the portions of said two members at the ends of their slots whereby said pin is subject to a tensile stress when the first member is moved in one direction.

2. The combination of a member having a guide; a slide movable on said guide; a second member attached to said slide so as to transmit power thereto; and a relatively weak element connecting and extending in the line of movement of, said members in position to be subjected to a tensile stress when the members are moved in one direction.

3. The combination of a plunger having a guide; a slide movable on the guide; a driving rod connected to the slide; with a relatively weak pin extending substantially parallel to the line of movement of the plunger and constituting a tension element connecting said plunger with the slide.

4. The combination of a member having a guideway; a plate mounted on said member and provided with a slot; a slide movable in the guideway and having a slot in line with that of said plate; with a pin extending through the slots and having heads respectively engaging the plate and the slide.

5. The combination of a reciprocable member having two opposite guideways; two plates mounted on said member and each provided with a slot; two slides operative in the guideways and having slots respectively in line with the slots of said plates; headed tension elements in said slots respectively; with a connecting rod pinned to said slides and operative between them.

6. The combination with the feed cylinder of a stoker of a plunger operative therein; a guideway in the plunger; a slide movable on the guideway and having a slot extending substantially parallel with its line of movement; a driving rod attached to said slide; and a relatively weak tension pin connected to the plunger and extending into the slot of said slide.

7. The combination with the feed cylinder of a stoker of a plunger reciprocable therein; a guide in the plunger; a slide movable on the guide; a relatively weak tension member connecting the slide with the plunger; and a driving rod connected to said slide.

8. The combination of a driven member having a guide; a plate mounted on said member and having an upwardly opening slot; a slide reciprocable in said guide and having a head provided with an upwardly opening slot in the line with that of said plate; a driving member connected to said slide; and a headed tension element removably mounted in said slots with its heads respectively in engagement with the plate and said slide.

MAXWELL ALPERN.